United States Patent
Kasai

(10) Patent No.: US 9,616,964 B2
(45) Date of Patent: Apr. 11, 2017

(54) BICYCLE WIRELESS CONTROL SYSTEM

(71) Applicant: Shimano Inc., Sakai, Osaka (JP)

(72) Inventor: Yoshiyuki Kasai, Osaka (JP)

(73) Assignee: Shimano Inc., Osaka (JP)

( * ) Notice: Subject to any disclaimer, the term of this patent is extended or adjusted under 35 U.S.C. 154(b) by 93 days.

(21) Appl. No.: 14/696,578

(22) Filed: Apr. 27, 2015

(65) Prior Publication Data

US 2016/0311499 A1 Oct. 27, 2016

(51) Int. Cl.
  *B62M 25/08* (2006.01)
  *B62L 3/02* (2006.01)
  *B62M 25/04* (2006.01)
  *B62K 23/06* (2006.01)
  *B62M 6/90* (2010.01)
  *B62K 25/04* (2006.01)

(52) U.S. Cl.
  CPC .............. *B62L 3/02* (2013.01); *B62K 23/06* (2013.01); *B62M 25/04* (2013.01); *B62M 25/08* (2013.01); *B62K 2025/044* (2013.01); *B62M 6/90* (2013.01); *Y02B 60/50* (2013.01)

(58) Field of Classification Search
  CPC . B62M 6/40; B62M 6/45; B62M 6/90; B62M 9/122; B62M 9/123; B62M 9/132; B62M 9/133; B62M 25/08; B62M 2701/0046; B62L 3/02; Y02B 60/50; F16H 59/044; H04W 52/0216; H04W 52/0212; H04W 52/0225; H04W 52/0229; H04W 52/0235
  See application file for complete search history.

(56) References Cited

U.S. PATENT DOCUMENTS

| | | | |
|---|---|---|---|
| 6,204,775 | B1 | 3/2001 | Kubacsi |
| 7,381,142 | B2 | 6/2008 | Campagnolo |
| 8,271,058 | B2 | 9/2012 | Rhee et al. |
| 8,655,561 | B2 | 2/2014 | Kitamura |
| 8,721,495 | B2 | 5/2014 | Kitamura et al. |
| 8,738,212 | B1 * | 5/2014 | Schieffelin ............... B62M 6/45 180/205.1 |
| 8,874,338 | B2 | 10/2014 | Miglioranza |
| 8,909,424 | B2 | 12/2014 | Jordan et al. |
| 2005/0143145 | A1 | 6/2005 | Maekawa |
| 2009/0240858 | A1 | 9/2009 | Takebayashi |

(Continued)

FOREIGN PATENT DOCUMENTS

| | | |
|---|---|---|
| EP | 1 103 456 A2 | 5/2001 |
| EP | 2 719 616 A2 | 4/2014 |

*Primary Examiner* — Spencer Patton
(74) *Attorney, Agent, or Firm* — Global IP Counselors, LLP

(57) ABSTRACT

A bicycle wireless control system is basically provided with a first bicycle electric component and a second bicycle electric component. The first bicycle electric component includes at least one operating member and a first wireless communication unit that wirelessly transmits a control signal in response to an operation of the at least one operating member. The second bicycle electric component includes a second wireless communication unit that is configured to wirelessly receive the control signal from the first wireless communication unit and to wirelessly transmit an acknowledgement signal to the first wireless communication unit upon receiving the control signal from the first wireless communication unit.

16 Claims, 13 Drawing Sheets

(56) References Cited

U.S. PATENT DOCUMENTS

| | | | |
|---|---|---|---|
| 2010/0207351 A1* | 8/2010 | Klieber | B62K 19/36 280/278 |
| 2010/0214222 A1 | 8/2010 | Yen | |
| 2012/0024639 A1* | 2/2012 | Castro | B60T 7/16 188/24.22 |
| 2013/0145885 A1* | 6/2013 | Kitamura | B62M 25/08 74/473.12 |
| 2014/0102237 A1* | 4/2014 | Jordan | B62K 23/02 74/473.12 |

* cited by examiner

BICYCLE WIRELESS CONTROL SYSTEM

BACKGROUND

Field of the Invention

This invention generally relates to a bicycle wireless control system. More specifically, the present invention relates to a bicycle wireless control system which wirelessly communicates between two electric bicycle components or devices.

Background Information

In recent years, some bicycles are provided with electric components or devices to make it easier for the rider to operate the bicycle. In more recent years, bicycle control systems exist that wirelessly control these electric bicycle components or devices. A bicycle wireless control system is advantageous in that electrical cables connecting electric bicycle components to each other can be omitted. Examples of some these electric bicycle components include suspensions, transmission devices (e.g., derailleurs, internally geared hubs, etc.) and seatposts. Typically, bicycles equipped with electric bicycle components are also provided a control device for each of the electric bicycle components.

SUMMARY

In accordance with a first aspect of the present disclosure, a bicycle wireless control system is provided that basically comprises a first bicycle electric component and a second bicycle electric component. The first bicycle electric component includes at least one operating member and a first wireless communication unit that wirelessly transmits a control signal in response to an operation of the at least one operating member. The second bicycle electric component includes a second wireless communication unit that is configured to wirelessly receive the control signal from the first wireless communication unit and to wirelessly transmit an acknowledgement signal to the first wireless communication unit upon receiving the control signal from the first wireless communication unit.

In accordance with a second aspect of the present invention, the bicycle wireless control system according to the first aspect is configured so that the first bicycle electric component further includes a controller programed to stop transmitting the control signal from the first wireless communication unit upon receiving the acknowledgement signal from the second wireless communication unit.

In accordance with a third aspect of the present invention, the bicycle wireless control system according to the first aspect is configured so that the second bicycle electric component further includes a controller programed to periodically operate the second wireless communication unit for a predetermined listening period and programed to periodically suspend the second wireless communication unit for a predetermined non-listening period after the predetermined listening period passes.

In accordance with a fourth aspect of the present invention, the bicycle wireless control system according to the first aspect is configured so that the second wireless communication unit is configured to wirelessly transmit an additional acknowledgement signal if the first wireless communication unit continues to wirelessly transmit the control signal after the second wireless communication unit transmits the acknowledgement signal.

In accordance with a fifth aspect of the present invention, the bicycle wireless control system according to the first aspect is configured so that the first wireless communication unit is configured to stop wirelessly transmitting the control signal after a predetermined stop period passes.

In accordance with a sixth aspect of the present invention, the bicycle wireless control system according to the fifth aspect is configured so that the second bicycle electric component further includes a controller programed to periodically operate the second wireless communication unit for a predetermined listening period and programed to periodically suspend the second wireless communication unit for a predetermined non-listening period after the listening predetermined period passes, and the predetermined stop period is equal to or longer than the predetermined non-listening period.

In accordance with a seventh aspect of the present invention, the bicycle wireless control system according to the first aspect is configured so that the first bicycle electric component includes an on-board power source.

In accordance with an eighth aspect of the present invention, the bicycle wireless control system according to the seventh aspect is configured so that the on-board power source includes a fuel cell.

In accordance with a ninth aspect of the present invention, the bicycle wireless control system according to the first aspect is configured so that the second bicycle electric component includes an on-board power source.

In accordance with a tenth aspect of the present invention, the bicycle wireless control system according to the ninth aspect is configured so that the on-board power source includes a fuel cell.

In accordance with an eleventh aspect of the present invention, the bicycle wireless control system according to the first aspect is configured so that the first bicycle electric component includes a power source electrically connected to the controller by an electrical wire.

In accordance with a twelfth aspect of the present invention, the bicycle wireless control system according to the first aspect is configured so that the second bicycle electric component includes a power source electrically connected to an electrical actuator by an electrical wire.

In accordance with a thirteenth aspect of the present invention, the bicycle wireless control system according to the first aspect is configured so that the first bicycle electric component includes an operating device; and the second bicycle electric component includes a bicycle electric shifting device.

In accordance with a fourteenth aspect of the present invention, the bicycle wireless control system according to the thirteenth aspect is configured so that the bicycle electric shifting device is a bicycle derailleur.

In accordance with a fifteenth aspect of the present invention, the bicycle wireless control system according to the thirteenth aspect is configured so that the bicycle electric shifting device includes an internally geared hub.

In accordance with a sixteenth aspect of the present invention, the bicycle wireless control system according to the first aspect is configured so that the first bicycle electric component includes a suspension control device; and the second bicycle electric component includes a bicycle electric suspension.

In accordance with a seventeenth aspect of the present invention, the bicycle wireless control system according to the first aspect is configured so that the first bicycle electric component includes a seatpost control device; and the second bicycle electric component includes an electric adjustable seatpost.

In accordance with an eighteenth aspect of the present invention, the bicycle wireless control system according to the first aspect is configured so that the first bicycle electric component includes a power-assisted control device; and the second bicycle electric component includes an electric power-assisted motor.

Also other objects, features, aspects and advantages of the disclosed bicycle wireless control system will become apparent to those skilled in the art from the following detailed description, which, taken in conjunction with the annexed drawings, discloses one embodiment of the bicycle wireless control system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
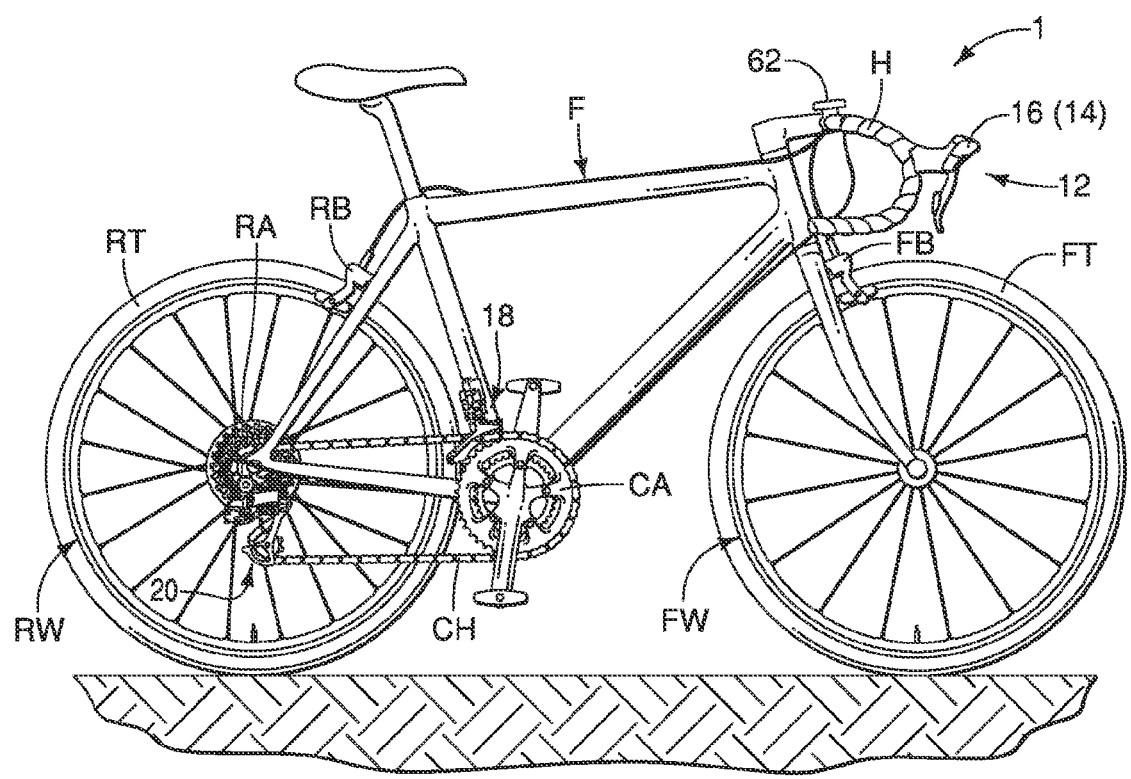
FIG. 1 is a side elevational view of a bicycle that includes a bicycle wireless control system mounted to the handlebar of the bicycle in accordance with a first embodiment.

Referring initially to FIG. 1, a bicycle 1 is illustrated that is equipped with a bicycle wireless control system 12 in accordance with a first embodiment. The bicycle wireless control system 12 is an electrically powered system. In the illustrated embodiment, the bicycle wireless control system 12 basically includes a first (front) operating device 14, a second (rear) operating device 16, a first (front) bicycle electric shifting device 18 and a second (rear) bicycle electric shifting device 20. Thus, the bicycle wireless control system 12 is a bicycle electric shifting apparatus. However, the bicycle wireless control system 12 is not limited to this particular arrangement. The bicycle wireless control system 12 can be used with other systems and/or components of the bicycle 1, such as adjustable suspension, adjustable seatposts, bicycle computers, etc.

Basically, the bicycle wireless control system 12 comprises a first electric component and a second electric component that are configured to wirelessly communicate. The first and second operating devices 14 and 16 are each an example of a first electric component of the bicycle wireless control system 12. In the illustrated embodiment, the first and second operating devices 14 and 16 are shifters that include a braking function. The first and second bicycle electric shifting devices 18 and 20 are each an example of a second electric component of the bicycle wireless control system 12. Stated differently, each of the first bicycle electric components is an operating device, and each of the second bicycle electric components is a bicycle electric shifting device. Thus, in the first illustrated embodiment, the first and second bicycle electric shifting devices 18 and 20 are bicycle derailleurs. Specifically, the first bicycle electric shifting device 18 is a front bicycle derailleur, while the second bicycle electric shifting device 20 is a rear bicycle derailleur.

Referring to FIG. 1, the bicycle 1 includes, among other things, a bicycle frame F with a handlebar H, a front wheel FW, a rear wheel RW, a front brake FB and a rear brake RB. Referring again to FIG. 1, the front wheel FW is mounted in a conventional manner to a steering fork attached to the bicycle frame F below the handlebar H. A front tire FT is attached to the front wheel FW. The rear wheel RW includes a rear sprocket assembly SA. The rear wheel RW is mounted in a conventional manner to a rear portion of the bicycle frame F. A rear tire RT is attached to the rear wheel RW. A crank assembly CA, as shown in FIG. 1, is rotatably supported to a lower portion of the bicycle frame F in a conventional manner. The crank assembly CA includes a set of front sprockets mounted to the crank axle in a conventional manner. A chain CH is operatively coupled between the rear sprockets and the rear sprockets in a conventional manner. Since the front wheel FW, the rear wheel RW, the front brake FB, the rear brake RB, the rear sprocket assembly SA and the crank assembly CA are all conventional elements, no further description is provided for the sake of brevity. Also, while the bicycle 1 is illustrated as a road bicycle, the bicycle wireless control system 12 can be used with other types of bicycles.

Figure 2:
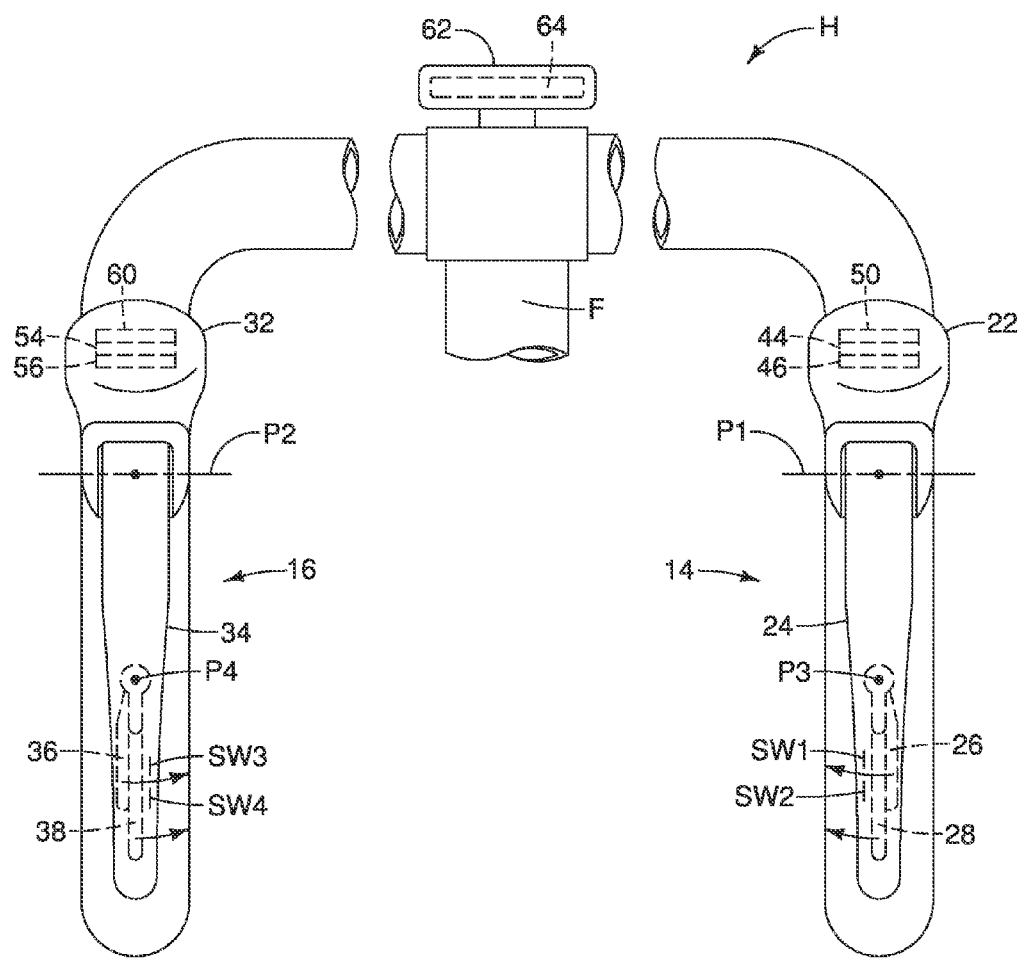
FIG. 2 is a front elevational view of a bicycle handlebar area of the bicycle illustrated in FIG. 1.
Figure 3:
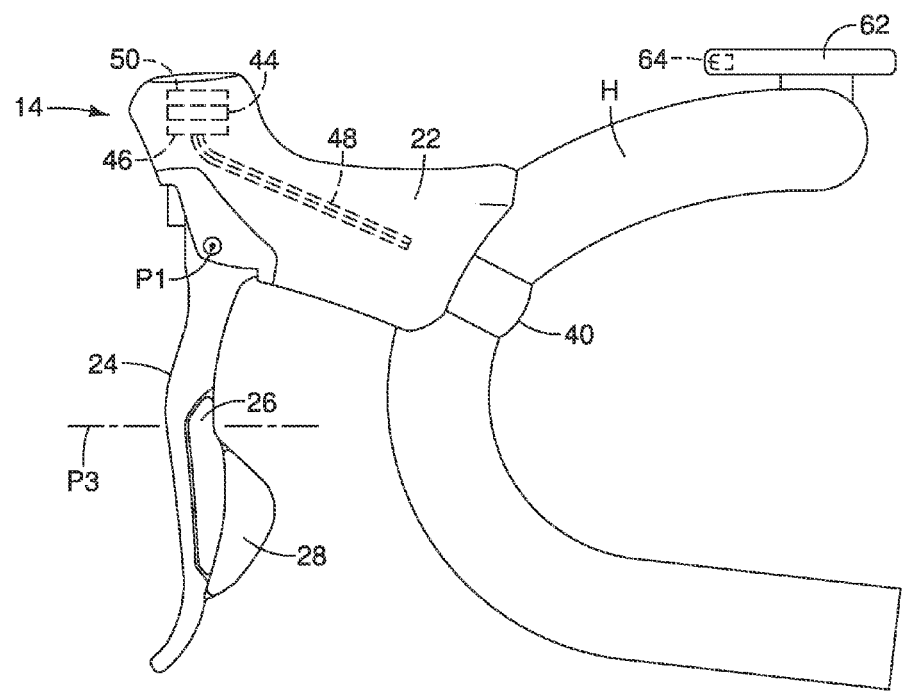
FIG. 3 is a side elevational view of the handlebar and the left or first operating device (front shifter) showing a left outboard side of the bicycle illustrated in FIG. 1.
Figure 4:
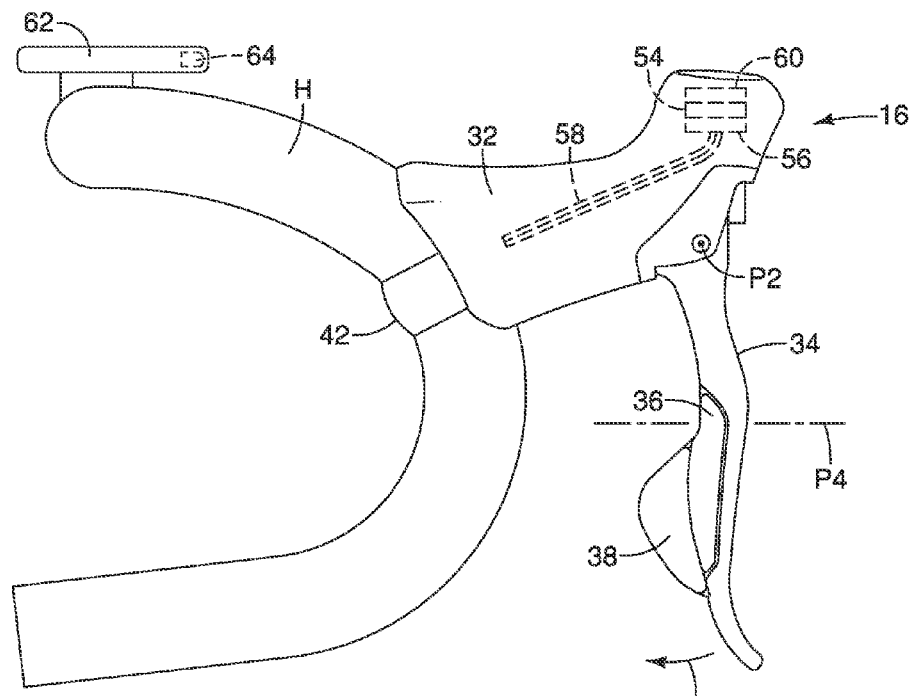
FIG. 4 is a side elevational view of the handlebar and the right or second operating device (rear shifter) showing a right outboard side of the bicycle illustrated in FIG. 1.

Referring now to FIGS. 2 to 4, the first and second operating devices 14 and 16 will now be discussed. In the first illustrated embodiment, the first operating device 14 (i.e., left hand shift/brake control device) controls the first bicycle electric shifting device 18 and the front brake FB. Basically, the first operating device 14 includes a bracket 22, a brake operating member 24, a first shift operating member 26 and a second shift operating member 28. The second operating device 16 (i.e., right hand shift/brake control device) controls the second bicycle electric shifting device 20 and the rear brake RB. Basically, the second operating device 16 includes a bracket 32, a brake operating member 34, a first shift operating member 36 and a second shift operating member 38. It will be apparent to those skilled in the bicycle field from this disclosure that the first and second operating devices 14 and 16 are not limited to this configuration. Thus, each of the first and second operating devices 14 and 16 constitutes a first bicycle electric component including at least one operating member.

The brackets 22 and 32 are preferably made of a lightweight material such as composite materials, plastic, polymers or light weight metals such as aluminum or titanium. The first operating device 14 includes a bicycle frame attachment member 40 that attaches the bracket 22 to a left portion of the handlebar H in a conventional manner. The second operating device 16 includes a bicycle frame attachment member 42 that attaches the bracket 32 to a right portion of the handlebar H in a conventional manner. Here, the brake operating member 24 is a brake lever that is pivotally mounted to the bracket 22 about a pivot axis P1, while the brake operating member 34 is a brake lever that is pivotally mounted to the bracket 32 about a pivot axis P2. Of course, the first and second operating devices 14 and 16 are not limited to being mounted on the handlebar H. The first and second operating devices 14 and 16 can be positioned anywhere within reach of the user.

As see in FIG. 2, the first and second shift operating members 26 and 28 are pivotally mounted to the brake operating member 24 about a pivot axis P3. The first shift operating member 26 operates a switch SW1 as the first shift operating member 26 pivots about the pivot axis P3 from a rest position (FIG. 2) to an operated position. The second shift operating member 28 operates a switch SW2 as the first shift operating member 26 pivots about the pivot axis P3 from a rest position (FIG. 2) to an operated position. The first and second shift operating members 26 and 28 are trigger levers that are biased to their rest positions such that they each automatically return to their rest positions upon being released from an operated position. The term "rest position" as used herein refers to a state in which a movable part (e.g., the first and second shift operating members 26 and 28) remains stationary without the need of a user intervening (e.g., holding the movable part) to establish a state corresponding to the rest position. Thus, the term "rest position" can also be referred to as a non-operated position. The switches SW1 and SW2 can be any type of switches. For example, the switches SW1 and SW2 can include any type of toggle switch, pressure switch, contactless switch or any other suitable type of switch that provides an transmit signal in response to shifting movement of the first and second shift operating members 26 and 28 about the pivot axis P3 to effect upshifting and downshifting.

The first and second shift operating members 36 and 38 are pivotally mounted to the brake operating member 34 about a pivot axis P4. The first shift operating member 36 operates a switch SW3 as the first shift operating member 36 pivots about the pivot axis P4 from a rest position (FIG. 2) to an operated position. The second shift operating member 38 operates a switch SW4 as the first shift operating member 26 pivots about the pivot axis P4 from a rest position (FIG. 2) to an operated position. The first and second shift operating members 36 and 38 are trigger levers that are biased to their rest positions such that they each automatically return to their rest positions upon being released from an operated position. The switches SW3 and SW4 can be any type of switches. For example, the switches SW3 and SW4 can include any type of toggle switch, pressure switch, contactless switch or any other suitable type of switch that provides an output signal in response to shifting movement of the first and second shift operating members 36 and 38 about the pivot axis P4 to effect upshifting and downshifting.

In the first illustrated embodiment, the first operating device 14 further includes a first controller 44 and a first wireless communication unit 46. The term "wireless communication unit" as used herein includes a transceiver or a transmitter-receiver, and contemplates any device or devices, separate or combined, capable of transmitting and receiving wireless signals, including shift signals or control, command or other signals related to some function of the component being controlled. Thus, the first wireless communication unit 46 is a two-way wireless communication unit.

The first controller 44 is electrically connected to the switches SW1 and SW2 by electrical wires (not shown). The first controller 44 is also electrically connected to the first wireless communication unit 46. For example, the first controller 44 and the first wireless communication unit 46 can be provided on a printed circuit board that is mounted to the bracket 22. In the first illustrated embodiment, the first operating device 14 further includes an antenna 48 that is electrically connected to the first wireless communication unit 46 for transmitting signals indicative of the operation of the switches SW1 and SW2 by the first and second shift operating members 26 and 28. In the first illustrated embodiment, the first operating device 14 (i.e., the first bicycle electric component) further includes a first on-board power source 50 that can be provided on the printed circuit board for the first controller 44 and the first wireless communication unit 46. Thus, the first operating device 14 constitutes a first wireless communication unit that wirelessly transmits a control signal in response to an operation of the at least one operating member. Alternatively or in addition, as seen in FIG. 7, the first bicycle electric component includes a first external power source 50' that is electrically connected to the first controller 44 and the first wireless communication unit 46 by an electrical wire W.

Figure 7:
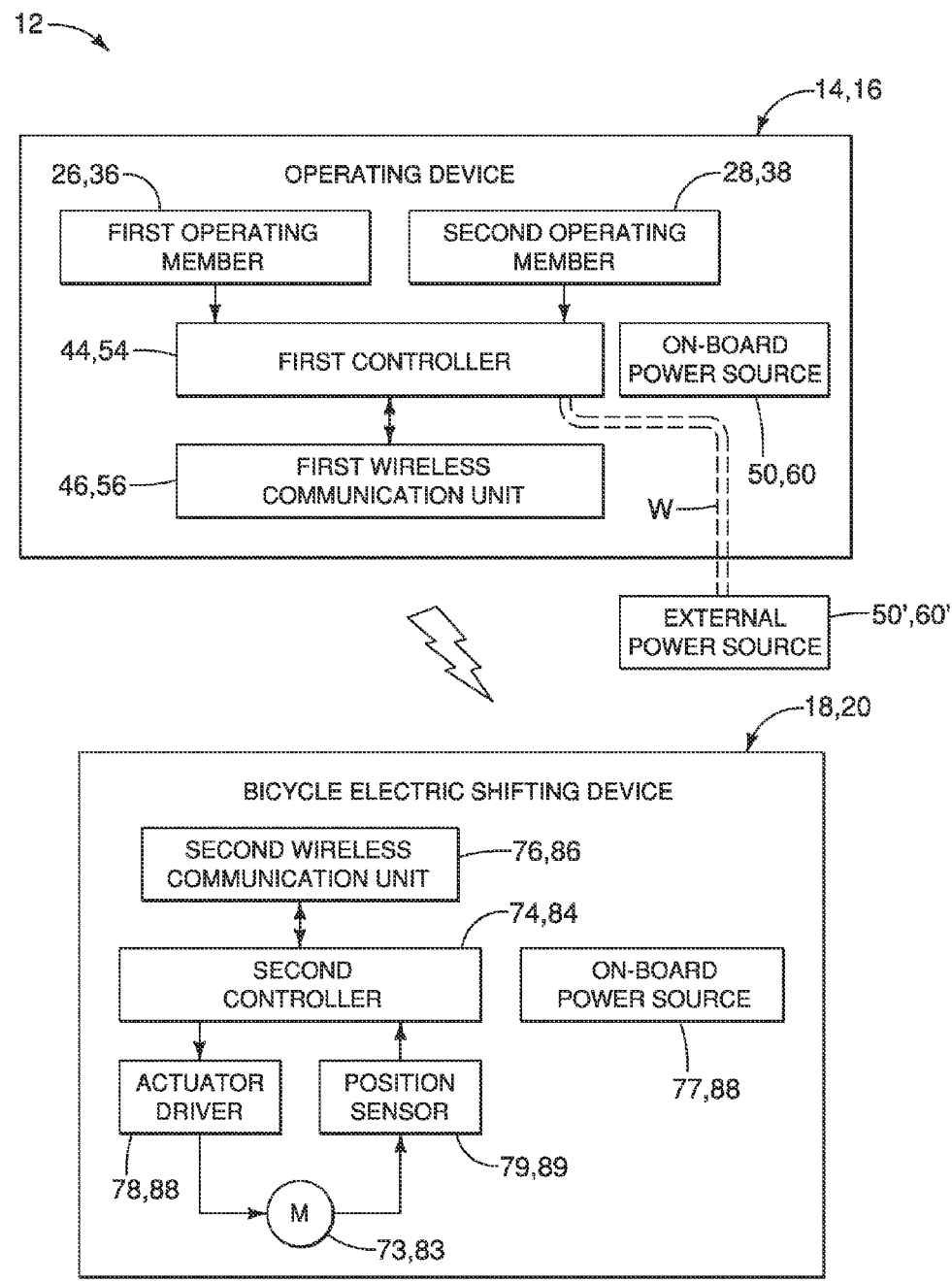
FIG. 7 is a simplified schematic block diagram of an example of the bicycle wireless control system having one of the operating devices and one of the bicycle electric shifting devices (e.g., one of the rear and front derailleurs) of the bicycle shown in FIG. 1.

Similarly, in the first illustrated embodiment, as seen in FIG. 7, the second operating device 16 further includes a first controller 54 and a first wireless communication unit 56. The first wireless communication unit 56 can be a two-way wireless communication unit if needed and/or desired. The first controller 54 is electrically connected to the switches SW3 and SW4 by electrical wires (not shown). The first controller 54 is also electrically connected to the first wireless communication unit 56. For example, the first controller 54 and the first wireless communication unit 56 can be provided on a printed circuit board that is mounted to the bracket 32. In the first illustrated embodiment, the first operating device 16 further includes an antenna 58 that is electrically connected to the first wireless communication unit 56 for transmitting signals indicative of the operation of the switches SW3 and SW4 by the first and second shift operating members 36 and 38. In the first illustrated embodiment, the second operating device 16 further includes an first on-board power source 60 that can be provided on the printed circuit board for the first controller 54 and the first wireless communication unit 56. Alternatively or in addition, as seen in FIG. 7, the first bicycle electric component includes an external first power source 60' that is electrically connected to the first controller 54 and the first wireless communication unit 56 by an electrical wire W. Thus, the second operating device 16 also constitutes a first wireless communication unit that wirelessly transmits a control signal in response to an operation of the at least one operating member.

Each of the first controllers 44 and 54 is preferably a micro-computer that includes conventional components such as includes a central processing unit (CPU), an input interface circuit, an output interface circuit, and storage devices such as a ROM (Read Only Memory) device, a RAM (Random Access Memory) device and/or a FLASH memory device. The first controller 44 is programmed to process signals from the switches SW1 and SW2 as upshifting signals and downshifting signals, respectively, for shifting the first bicycle electric shifting device 18. The first controller 54 is programmed to process signals from the switches SW3 and SW4 as upshifting signals and downshifting signals, respectively, for shifting the second bicycle electric shifting device 20.

The first wireless communication unit 46 reads or otherwise receives operation signals from the first controller 44, and transmits wireless control signals indicative of the operation of the SW1 and/or SW2 by the first shift operating member 26 and/or the second shift operating member 28. Similarly, the first wireless communication unit 56 reads or otherwise receives operation signals from the first controller 54, and transmits wireless control signals indicative of the operation of the SW3 and/or SW4 by the first shift operating member 36 and/or the second shift operating member 38. The wireless control signals can be radio frequency (RF) signals or any other type of signal suitable for wireless communications as understood in the bicycle field. It should also be understood that the first and second wireless communication units 46 and 56 can transmit the signals at a particular frequency and/or with an identifier such as a particular code, to distinguish the wireless control signal from other wireless control signals. In this way, the first bicycle electric shifting device 18 can recognize which control signals are upshifting signals for the first bicycle electric shifting device 18 and which control signals are downshifting signals for the first bicycle electric shifting device 18. Likewise, the second bicycle electric shifting device 20 can recognize which control signals are upshifting signals for the second bicycle electric shifting device 20 and which control signals are downshifting signals for the second bicycle electric shifting device 20. Thus, first bicycle electric shifting device 18 ignores the control signals for the second bicycle electric shifting device 20, and the second bicycle electric shifting device 20 ignores the control signals for the first bicycle electric shifting device 18.

Each of the first on-board power sources 50 and 60 can include a hydrogen powered fuel cell, a secondary battery, or a generator configured to generate an electric power. In the case of a generator, for example, the on-board power sources 50 and 60 can include a piezoelectric element that is configured to generate the electric power by a pressure due to the operation of one of the switches SW1 to SW4.

As seen in FIGS. 2 to 4, in the first illustrated embodiment, the bicycle wireless control system 12 further includes a cycle computer or control unit 62 that is mounted to a central portion of the handlebar H in a conventional manner. The control unit 62 is preferably a micro-computer that includes conventional components such as includes a central processing unit (CPU), an input interface circuit, an output interface circuit, and storage devices such as a ROM (Read Only Memory) device, a RAM (Random Access Memory) device and/or a FLASH memory device. In the first illustrated embodiment, the control unit 62 includes a wireless receiver 64, which can receive information from the first and second wireless communication units 46 and 56 of the first and second operating devices 14 and 16, respectively. Alternatively, the control unit 62 can be electrically coupled to the first and second operating devices 14 and 16 via wires or other suitable connections.

Figure 5:
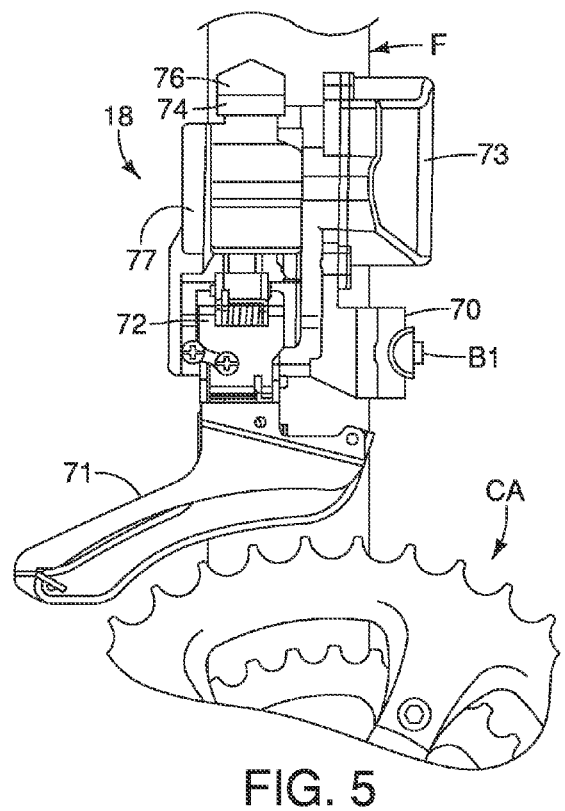
FIG. 5 is a side elevational view of the front bicycle derailleur as one of the bicycle electric shifting devices of the bicycle illustrated in FIG. 1.
Figure 6:
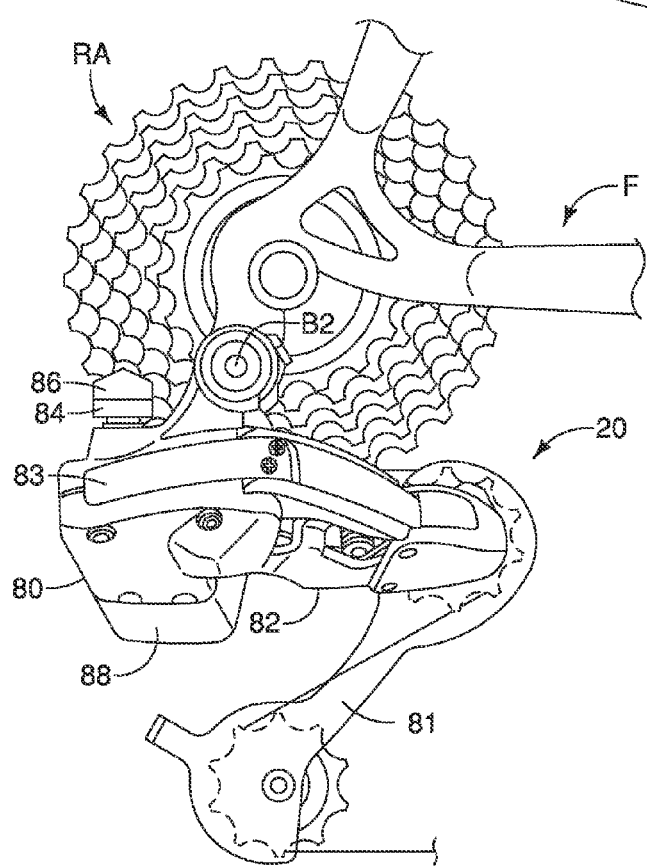
FIG. 6 is a side elevational view of the rear bicycle derailleur as one of the bicycle electric shifting devices of the bicycle illustrated in FIG. 1.

Referring now to FIGS. 5 and 6, the first and second bicycle electric shifting devices 18 and 20 will now be discussed. As mentioned above, the first and second bicycle electric shifting devices 18 and 20 are bicycle derailleurs. However, it will be apparent to those skilled in the bicycle field from this disclosure that the bicycle electric shifting devices are not limited to bicycle derailleurs. For example, the rear bicycle electric shifting device can be an internally geared hub as diagrammatically illustrated in FIG. 14.

As seen in FIG. 5, the first bicycle electric shifting device 18 is a bicycle front derailleur that has a base member 70, a chain guide 71 and a linkage 72. The base member 70 is configured to be attached to the bicycle 1. In particular, the base member 70 is attached to the bicycle frame F adjacent to the crank assembly CA by a bolt B1. The chain guide 71 is movably supported relative to the base member 70. Specifically, in the first illustrated embodiment, the linkage 72 movably supports the chain guide 71 relative to the base member 70. Here, the linkage 72 includes two links that are pivotally connected between the base member 70 and the chain guide 71 to form a four-bar linkage.

The chain guide 71 is configured to move the chain C between the front sprockets of the crank assembly CA in response to the operation of the first operating device 14 of the bicycle wireless control system 12. More specifically, the first bicycle electric shifting device 18 (the second electric component) further includes an electric actuator 73 that is mechanically connected to the linkage 72. Operation of the actuator 73 moves the linkage 72, which in turn moves the chain guide 71 relative to the base member 70. The actuator 73 is operated based on wireless control signals from the first operating device 14. Here, the actuator 73 is a reversible electric motor.

In order to receive and process the wireless control signals from the first operating device 14, the first bicycle electric shifting device 18 further includes a second controller 74 and a second wireless communication unit 76. The second wireless communication unit 76 is a two-way wireless communication unit. The second wireless communication unit 76 is configured to wirelessly receive the control signals from the first wireless communication unit 46. The second controller 74 is operatively connected to the second wireless communication unit 76.

Figure 9:
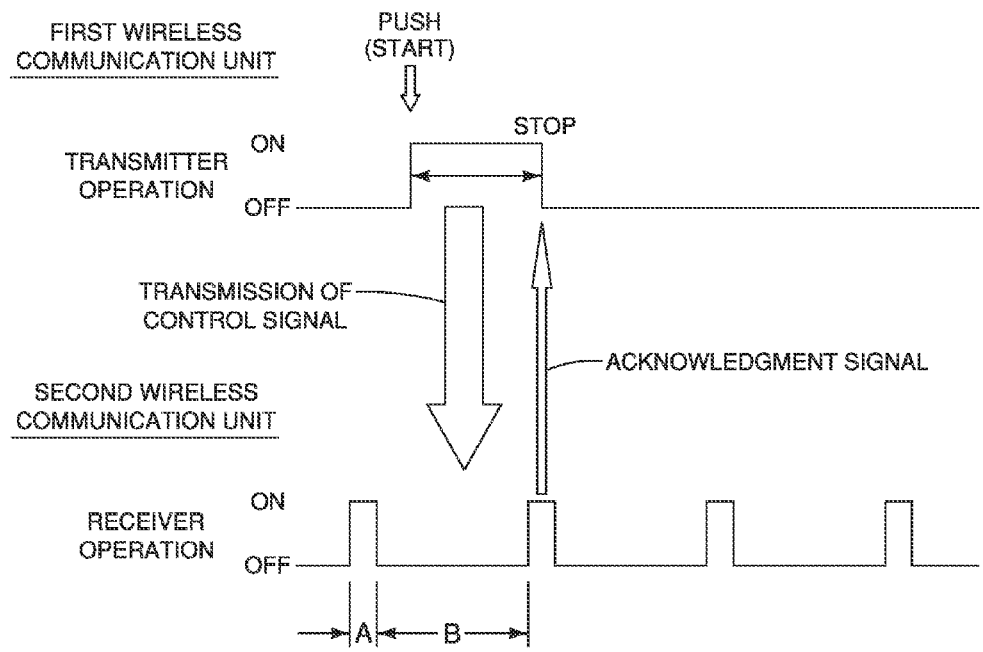
FIG. 9 is a communication timing diagram illustrating exemplary communications in which the first controller executes the control process of FIG. 8 such that an acknowledgement signal is transmitted by the second wireless communication unit in response to receiving the control signal from the first wireless communication unit, and such that the first wireless communication unit stops transmitting the control signal in response to receiving the acknowledgement signal.

As seen in FIG. 9, the second controller 74 is programed to periodically operate the second wireless communication unit 76 for a predetermined listening period A to receive the control signals from the first wireless communication unit 46, as explained below. The second controller 74 is programed to periodically suspend the second wireless communication unit 76 for a predetermined non-listening period B after the listening predetermined period A passes. The second controller 74 is programmed to operate the actuator 73 based on at least one of the control signals being received by the second wireless communication unit 76. The first bicycle electric shifting device 18 (the second electric component) further includes a second on-board power source 77 for supplying electrical power to the electrical parts of the first bicycle electric shifting device 18. The on-board power source 77 can include a hydrogen powered fuel cell or a secondary battery.

Alternatively, the power source can be a remotely located external power source. The first bicycle electric shifting device 18 further includes an electric actuator driver 78 and a position sensor 79 for controlling the actuator 73 to accurately position the chain guide 71 with respect to the chainrings of the chainring assembly CR.

The second wireless communication unit 76 receives the control signals from the first wireless communication unit 46, and can recognize the wireless control signals based on the particular frequency of the control signal and/or an identifier included in the control signal. As explained below, the second controller 74 controls the second wireless communication unit 76 such that one signal receiving operation of the second wireless communication unit 76 comprises an initial operation, a closing operation, and an interval between the initial operation and the closing operation. Due to the interval in each signal receiving operation, the operating time of the second wireless communication unit 76 is reduced. Thus, the electricity consumption of the first bicycle electric shifting device 18 can be reduced.

The second controller 74 is preferably a micro-computer that includes conventional components such as includes a central processing unit (CPU), an input interface circuit, an output interface circuit, and storage devices such as a ROM (Read Only Memory) device, a RAM (Random Access Memory) device and/or a FLASH memory device. The second controller 74 is programmed to process the wireless control signals received by the wireless control signals from the second wireless communication unit 76, and the control the operation of the actuator 73 using the actuator driver 78 and the position sensor 79. As explained below, the second controller 74 is also programmed to control the operation of the second wireless communication unit 76 in such a manner to reduce the power consumption of the on-board power source 77.

As seen in FIG. 6, the second bicycle electric shifting device 20 is a bicycle rear derailleur that has a base member 80, a chain guide 81 and a linkage 82. The base member 80 is configured to be attached to the bicycle 1. In particular, the base member 80 is attached to the bicycle frame F adjacent to the rear sprocket assembly SA by a bolt B2. The chain guide 81 is movably supported relative to the base member 80. Specifically, in the first illustrated embodiment, the linkage 82 movably supports the chain guide 81 relative to the base member 80. Here, the linkage 82 includes two links that are pivotally connected between the base member 80 and a movably member of the chain guide 81 to form a four-bar linkage.

The chain guide 81 is configured to move the chain C between the rear sprockets of the rear sprocket assembly SA in response to the operation of the second operating device 16 of the bicycle wireless control system 12. More specifically, the second bicycle electric shifting device 20 (the second electric component) further includes an electric actuator 83 that is mechanically connected to the linkage 82. Operation of the actuator 83 moves the linkage 82, which in turn moves the chain guide 81 relative to the base member 80. The actuator 83 is operated based on wireless control signals from the second operating device 16. Here, the actuator 83 is a reversible electric motor.

In order to receive and process the wireless control signals from the second operating device 16, the second bicycle electric shifting device 20 further includes a second wireless communication unit 86 and a second controller 84. The second wireless communication unit 86 is a two-way wireless communication unit. The second wireless communication unit 86 is configured to wirelessly receive the control signals from the first wireless communication unit 56. The second controller 84 is operatively connected to the second wireless communication unit 86. The second controller 84 is programed to periodically operate the second wireless communication unit 86 for a first predetermined listening period, as explained below, for receiving the control signals from the first wireless communication unit 56. The second controller 84 is programmed to operate the actuator 83 based on at least one of the control signals being received by the second wireless communication unit 86. The second bicycle electric shifting device 20 (the second electric component) further includes an on-board power source 88 for supplying electrical power to the electrical parts of the second bicycle electric shifting device 20. Alternatively, the power source can be a remotely located external power source. The second on-board power source 88 can include a hydrogen powered fuel cell or a secondary battery. The second bicycle electric shifting device 20 further includes an electric actuator driver 88 and a position sensor 89 for controlling the actuator 83 to accurately position the chain guide 81 with respect to the rear sprockets of the rear sprocket assembly CA.

The second wireless communication unit 86 receives the control signals from the first wireless communication unit 56, and can recognize the wireless control signals based on the particular frequency of the control signal and/or an identifier included in the control signal. As explained below, the second controller 84 controls the second wireless communication unit 86 such that one signal receiving operation of the second wireless communication unit 86 comprises an initial operation, a closing operation, and an interval between the initial operation and the closing operation. Due to the interval in each signal receiving operation, the operating time of the second wireless communication unit 86 is reduced. Thus, the electricity consumption of the second bicycle electric shifting device 20 can be reduced.

The second controller 84 is preferably a micro-computer that includes conventional components such as includes a central processing unit (CPU), an input interface circuit, an output interface circuit, and storage devices such as a ROM (Read Only Memory) device, a RAM (Random Access Memory) device and/or a FLASH memory device. The second controller 84 is programmed to process the wireless control signals received by the wireless control signals from the second wireless communication unit 86, and the control the operation of the actuator 83 using the actuator driver 88 and the position sensor 89. As explained below, the second controller 84 is also programmed to control the operation of the second wireless communication unit 86 in such a manner to reduce the power consumption of the on-board power source 88.

Referring now to FIG. 7, the bicycle wireless control system 12 will now be more generically discussed. As mentioned above, each of the first and second operating devices 14 and 16 constitutes a first electric component, while each of the first and second bicycle electric shifting devices 18 and 20 constitutes a second electric component. While the bicycle wireless control system 12 includes two of the first electric components and two of the second electric components, it will be apparent to those skilled in the bicycle field from this disclosure that the bicycle wireless control system 12 can have only one first electric component and one second electric component, or more than two of each of the first and second electric components as need and/or desired.

Thus, in its basic form, the first electric component (e.g., the operating device 14 or 16) includes at least one operating member (e.g., at least one of the operating members 26, 28, 36 or 38) and a first wireless communication unit (e.g., the first wireless communication unit 46 or 56) that wirelessly transmits a control signal in response to an operation of the at least one operating member. (e.g., at least one of the operating members 26, 28, 36 or 38). Also, in its basic form, the second electric component (e.g., the bicycle electric shifting devices 18 or 20) includes a second wireless communication unit (e.g., the second wireless communication unit 76 or 86) that is configured to wirelessly receive the control signal from the first wireless communication unit (e.g., the operating device 14 or 16) and to wirelessly transmit an acknowledgement signal to the first wireless communication unit (e.g., the first wireless communication unit 46 or 56) upon receiving the control signal from the first wireless communication unit (e.g., the first wireless communication unit 46 or 56).

Also, in its basic form, the first bicycle electric component (e.g., the operating device 14 or 16) further includes a first controller (e.g., the first controller 44 or 54) that is programed to stop transmitting the control signal from the first wireless communication unit (e.g., the first wireless communication unit 46 or 56) upon receiving the acknowledgement signal from the second wireless communication unit (e.g., the second wireless communication unit 76 or 86). Likewise, in its basic form, the second electric component (e.g., the bicycle electric shifting devices 18 or 20) further includes a second controller (e.g., the second controller 74 or 84) that is programed to periodically operate the second wireless communication unit (e.g., the second wireless communication unit 76 or 86) for a predetermined listening period and programed to periodically suspend the second wireless communication unit (e.g., the second wireless communication unit 76 or 86) for a predetermined non-listening period after the predetermined listening period passes.

In most cases, the second bicycle electric component (e.g., the bicycle electric shifting devices 18 or 20) further includes an electric actuator (e.g., the actuator 73 or 83) in which the second controller (e.g., the second controller 74 or 84) is programmed to operate the actuator (e.g., the actuator 73 or 83) based on at least one of the control signals being received by the second wireless communication unit (e.g., the second wireless communication unit 76 or 86). The second bicycle electric shifting device 20 (the second electric component) further includes a second on-board power source (e.g., the second on-board power source 77 or 88) for supplying electrical power to the electrical parts of the second electric component (e.g., the bicycle electric shifting devices 18 or 20). Alternatively, the power source can be a remotely located external power source.

Figure 8:
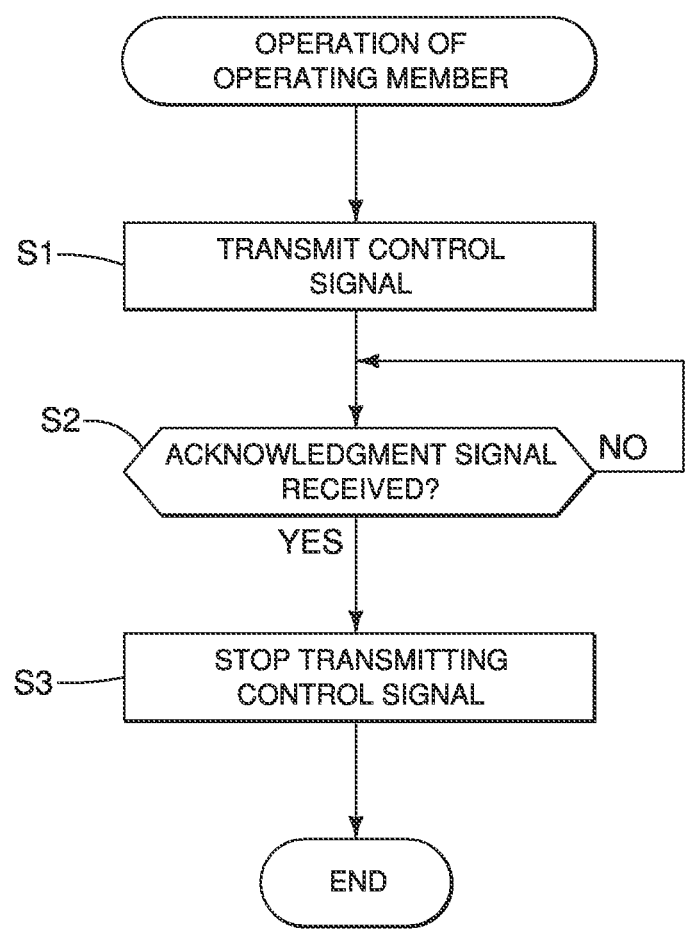
FIG. 8 is a flow chart illustrating a control process executed by the first controller of one of the operating devices in response to operation of the operating member of one of the operating devices.

Referring now to FIG. 8, a flow chart is shown of a control process executed by the first controllers 44 and 54 of the operating devices 14 and 16 in response to operation of one of the operating members 26, 28 and 36, 38 of the operating devices 14 and 16, respectively.

In step S1, the first controller 44 or 54 controls the first wireless communication unit 46 or 56 to continuously transmit a control signal in response to the operation of one of the operating members 26, 28 and 36, 38 of the operating device 14 or 16. Then, the control process proceeds to step S2.

In step S2, the first controller 44 or 54 determines whether an acknowledgement signal has been received by the first wireless communication unit 46 or 56 from the second wireless communication unit 76 or 86. Once the first wireless communication unit 46 or 56 receives the acknowledgement signal from the second wireless communication unit 76 or 86, the control process proceeds to step S3. On the other hand, if the acknowledgement signal is not received, then the first controller 44 or 54 continuously repeats step S3 such that the control signal is continuously transmitted until the acknowledgement signal is detected.

In step S3, the first controller 44 or 54 controls the first wireless communication unit 46 or 56 to stop transmitting the control signal.

Figure 10:
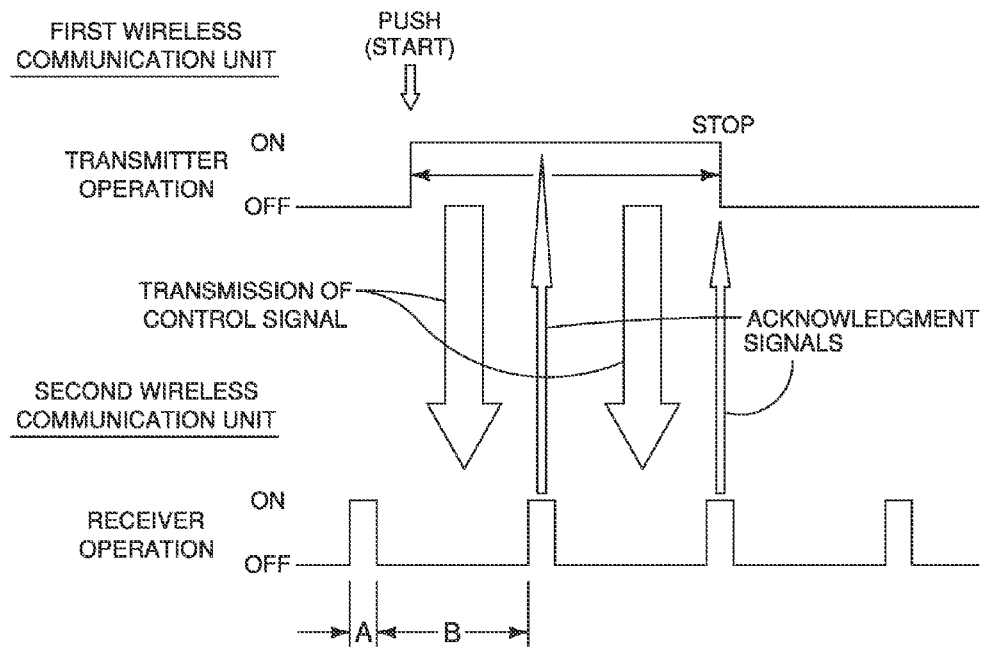
FIG. 10 is a communication timing diagram illustrating exemplary communications in which the first controller executes the control process of FIG. 8 such that two acknowledgement signals are transmitted by the second wireless communication unit in response to receiving the control signal from the first wireless communication unit over a period of time in which two listening periods occur due to the first wireless communication unit failing to receive the first of the two acknowledgement signals, and such that the first wireless communication unit stops transmitting the control signal in response to receiving the second of the two acknowledgement signals.

Referring now to FIGS. 9 and 10, communication timing diagrams are illustrated to show the wireless control signal of the first wireless communication unit 46 or 56 being received by a corresponding one of the second wireless communication unit 76 or 86, and then the corresponding one of the second wireless communication unit 76 or 86 transmitting the acknowledgement signal. In other words, this timing diagram applies to both the interaction between the first wireless communication unit 46 and the second wireless communication unit 76 and the interaction between the first wireless communication unit 56 and the second wireless communication unit 86. The first and second wireless communication units 46 and 56 and the second wireless communication units 74 and 84 can respectively communicate each other by using common wireless communication protocol, for example IEEE 802.15.4 communication protocol, but other suitable wireless communication protocol also can be used. It is possible to set the first wireless communication units 46 and 56 and the second wireless communication units 74 and 84 to one of a plurality of different selectable transmitter and receiver frequency channels to avoid crosstalk with other systems in the vicinity. The first wireless communication unit 46 is paired with the second wireless communication unit 76 in a conventional manner to enable wireless communication therebetween. Likewise, the first wireless communication unit 56 is paired with the second wireless communication unit 86 in a conventional manner to enable wireless communication therebetween. Alternatively, the second wireless communication unit 76 could be configured to wirelessly receive the control signals from the first wireless communication unit 56, and the second wireless communication unit 86 could be configured to wirelessly receive the control signals from the first wireless communication unit 46.

In the communication timing diagrams of FIGS. 9 and 10, the first controller 44 or 54 executes the control process of FIG. 8, when one of the operating members 26, 28, 36 or 38 is operated, the first wireless communication unit 46 or 56 continuously transmits a control signal until the acknowledgement signal from the second wireless communication unit 76 or 86 is detected by the first wireless communication unit 46 or 56. Thus, the first controller 44 or 54 is programed to stop transmitting the control signal from the first wireless communication unit 46 or 56 upon receiving the acknowledgement signal from the second wireless communication unit 76 or 86. As seen in FIGS. 9 and 10, the second controller 74 or 84 is programed to periodically operate the second wireless communication unit 76 or 86 for predetermined listening periods A. Thus, the second controller 74 or 84 is programed to periodically operate the second wireless communication unit 76 or 86 for the predetermined listening period A, and programed to periodically suspend the second wireless communication unit 76 or 86 for a predetermined non-listening period B after the predetermined listening period A passes. In the first illustrated embodiment of FIGS. 9 and 10, the predetermined listening periods A of the second wireless communication unit 76 or 86 are preferably smaller than non-listening periods B. For example, the predetermined listening periods A can be 90 microseconds, while the predetermined non-listening periods B can be 300 microseconds. As seen in the communication timing diagram of FIG. 10, in the event that the first acknowledgement signal from the second wireless communication unit 76 or 86 is not detected by the first wireless communication unit 46 or 56, in other words the control signal is still transmitted after the acknowledgement signal is transmitted, the second controller 74 or 84 is programed to control the second wireless communication unit 76 or 86 to transmit an additional acknowledgement signal during every listening period in which the first wireless communication unit 46 or 56 continues to wirelessly transmit the control signal. In other words, the second wireless communication unit 76 or 86 is configured to wirelessly transmit an additional acknowledgement signal if the first wireless communication unit 46 or 56 continues to wirelessly transmit the control signal after the second wireless communication unit 76 or 86 transmits the acknowledgement signal. Thus, once the first wireless communication unit 46 or 56 receives the acknowledgement signal from the second wireless communication unit 76 or 86, the first controller 44 or 54 stops the transmission of the control signal from the first wireless communication unit 46 or 56. With this relationship, the bicycle wireless control system 12 can reliably receive a control (shifting) signal from the first wireless communication unit 46 or 56 of the operating device 14 or 16.

Figure 11:
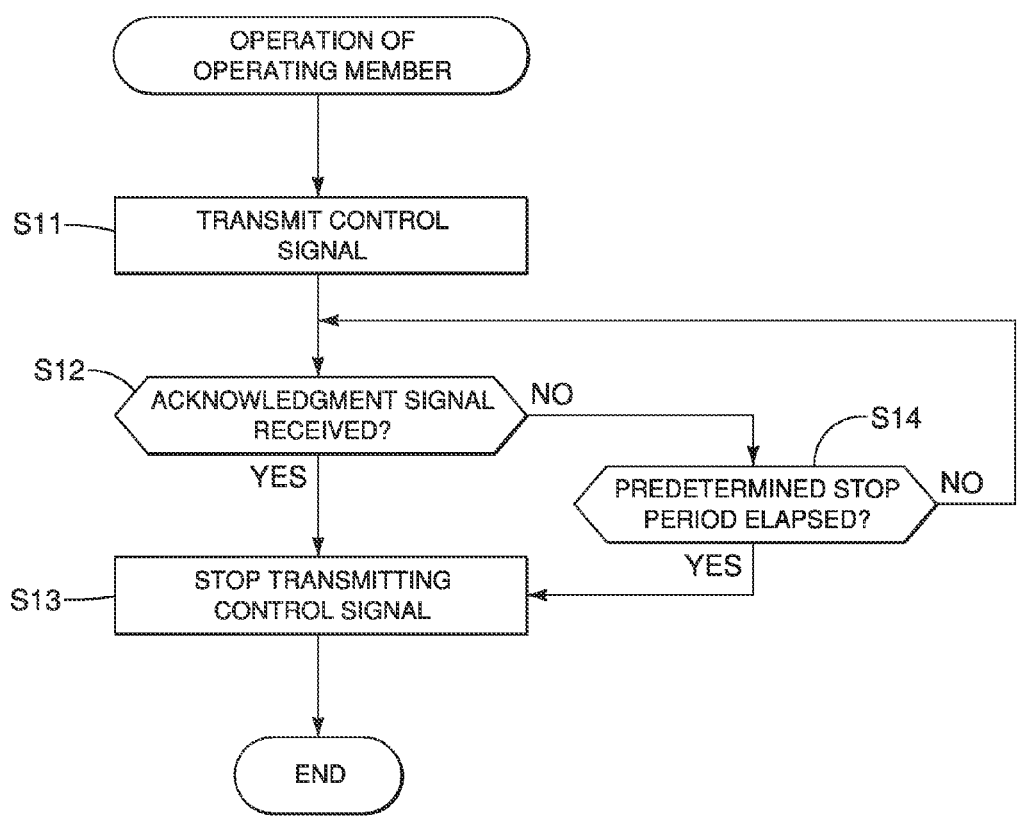
FIG. 11 is an alternate flow chart illustrating an alternate control process executed by the first controller of one of the operating devices in response to operation of the operating member of one of the operating devices.

Referring now to FIG. 11, an alternate flow chart is shown of an alternate control process executed by the first controllers 44 and 54 of the operating devices 14 and 16 in response to operation of one of the operating members 26, 28 and 36, 38 of the operating devices 14 and 16, respectively. The first controllers 44 and 54 can have both the control process of FIG. 8 and the control process of FIG. 11 stored in memory such that the rider can select between the two control processes.

Here, the control process includes a predetermined stop period C in which the first controllers 44 and 54 stops the control signal from being transmitted if the acknowledgement signal has not been received by the first wireless communication unit 46 or 56 with in the predetermined stop period C. In other words, the first wireless communication unit 46 or 56 is configured to stop wirelessly transmitting the control signal after a predetermined stop period C passes.

In step S11, the first controller 44 or 54 controls the first wireless communication unit 46 or 56 to continuously transmit a control signal in response to the operation of one of the operating members 26, 28 and 36, 38 of the operating device 14 or 16. Then, the control process proceeds to step S12.

In step S12, the first controller 44 or 54 determines whether an acknowledgement signal has been received by the first wireless communication unit 46 or 56 from the second wireless communication unit 76 or 86. Once the first wireless communication unit 46 or 56 receives the acknowledgement signal from the second wireless communication unit 76 or 86, the control process proceeds to step S13. On the other hand, if the acknowledgement signal is not received, then the control process proceeds to step S14.

In step S13, the first controller 44 or 54 controls the first wireless communication unit 46 or 56 to stop transmitting the control signal.

In step S14, the first controller 44 or 54 determines whether the predetermined stop period C has elapsed or not. If the predetermined stop period C has elapsed, then the control process proceeds to step S13, where the first controller 44 or 54 controls the first wireless communication unit 46 or 56 to stop transmitting the control signal. On the other hand, if the predetermined stop period C has not elapsed, then the control process proceeds back to step S12, where the first controller 44 or 54 determines whether an acknowledgement signal has been received by the first wireless communication unit 46 or 56. Thus, step S12 and step S14 are continuously repeated until either the acknowledgement signal is detected or the predetermined stop period C has elapsed.

Figure 12:
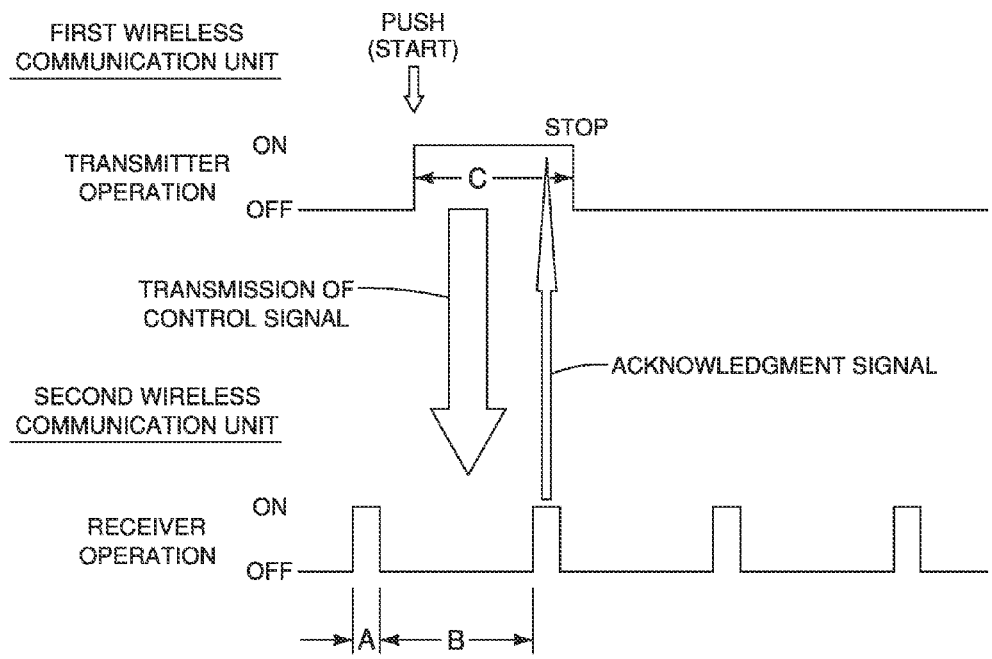
FIG. 12 is a communication timing diagram illustrating exemplary communications in which the first controller executes the control process of FIG. 11 such that an acknowledgement signal is transmitted by the second wireless communication unit in response to receiving the control signal from the first wireless communication unit and stops transmitting the control signal based on a predetermined stop period having elapsed where the first wireless communication unit failed to receive the acknowledgement signal.
Figure 13:
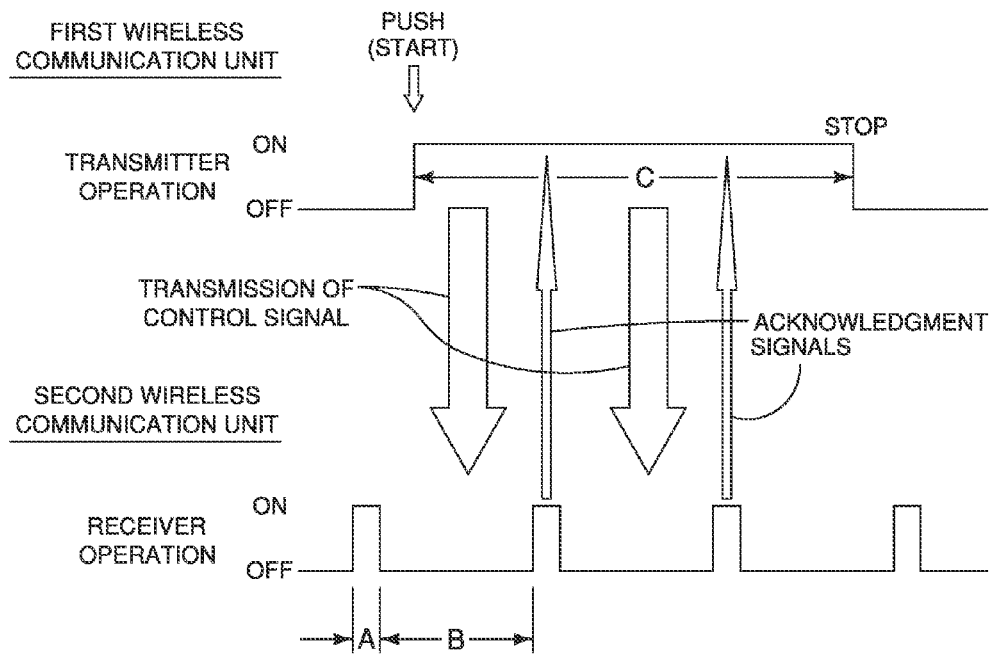
FIG. 13 is a communication timing diagram illustrating exemplary communications in which the first controller executes the control process of FIG. 11 such that two acknowledgement signals are transmitted by the second wireless communication unit in response to receiving the control signal from the first wireless communication unit over a period of time in which two listening periods occur, and stops transmitting the control signal based on a predetermined stop period having elapsed where the first wireless communication unit fails to receive the two acknowledgement signals.

Referring now to FIGS. 12 and 13, communication timing diagrams are illustrated to show the wireless control signal of the first wireless communication unit 46 or 56 being received by a corresponding one of the second wireless communication unit 76 or 86, and then the corresponding one of the second wireless communication unit 76 or 86 transmitting the acknowledgement signal. In the communication timing diagrams of FIGS. 12 and 13, the first controller 44 or 54 executes the control process of FIG. 11, when one of the operating members 26, 28, 36 or 38 is operated, the first wireless communication unit 46 or 56 continuously transmits a control signal until the acknowledgement signal from the second wireless communication unit 76 or 86 is detected by the first wireless communication unit 46 or 56 or the predetermined stop period C has elapsed.

FIGS. 12 and 13 illustrate exemplary communications in which one or more acknowledgement signals are transmitted but not detected by the first wireless communication unit 46 or 56. Thus, here, the control signal is stopped transmitting based on the predetermined stop period C having elapsed. FIG. 12 shows the situation in which the predetermined stop period C is equal to the predetermined non-listening period B, while FIG. 13 shows the situation in which the predetermined stop period C is longer than the predetermined non-listening period B.

Figure 14:
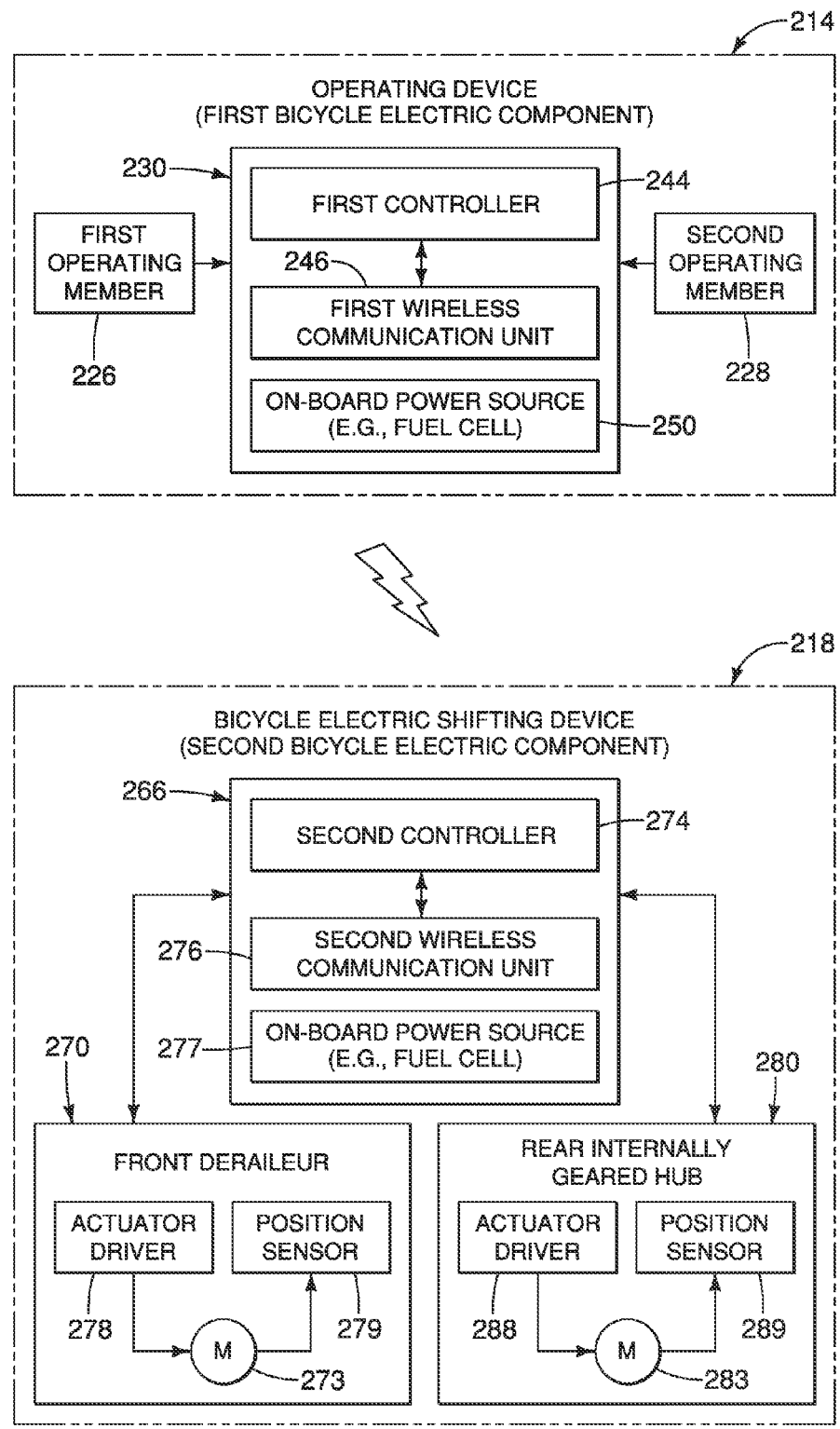
FIG. 14 is a simplified schematic block diagram of an example of a bicycle wireless control system having an operating device and a bicycle electric shifting device including a front derailleur and a rear internally geared hub.

Referring now to FIG. 14, a simplified schematic block diagram of a bicycle wireless control system is illustrated. Here, the bicycle wireless control system is a bicycle electric shifting apparatus that includes an operating device 214 as a first bicycle electric component and a bicycle electric shifting device 218 as a second bicycle electric component. Here, the operating device 214 includes a first shift operating member 226, a second shift operating member 228 and a first control unit 230. The first and second shift operating members 226 and 228 are directly connected by wires (diagrammatically represented by arrows) to the first control unit 230 to form the first bicycle electric component. The first control unit 230 includes a first controller 244 and a first wireless communication unit 246. Here, the control unit 230 further includes a first on-board power source 250 having a hydrogen powered fuel cell or a secondary battery. The first controller 244 is programmed in the same way as the first controller 44, discussed above to carry out the communication illustrated in FIGS. 8 to 13.

The bicycle electric shifting device 218 includes a second control unit 266 and at least one actuating unit such as an electric actuator 273 as explained below. The second control unit 266 includes a second controller 274 and a second wireless communication unit 276. Here, the second control unit 266 further includes a second on-board power source 277 having a hydrogen powered fuel cell or a secondary battery. The second controller 274 is programmed in the same way as the second controller 74, discussed above to carry out the communication illustrated in FIGS. 8 to 13.

The bicycle electric shifting device 218 further includes a bicycle front derailleur 270 that is directly connected by at least one wire (diagrammatically represented by an arrow) to the second control unit 266. In this way, the second control unit 266 and the bicycle front derailleur 270 are integrated to form the first bicycle electric component. The bicycle front derailleur 270 is identical to the bicycle front derailleur 18, discussed above. The bicycle front derailleur 270 includes the actuator 273 that is controlled by the second control unit 266 via an actuator driver 278. The bicycle front derailleur 270 further includes a position sensor 279 that sends signals to the second control unit 266 to aids in the second control unit 266 controlling the actuator 273, which is in the form of a reversible electric motor.

In the embodiment of FIG. 14, the bicycle electric shifting device 218 includes two actuator units, i.e., the actuator 273 and an electric actuator 283, that are controlled by the second control unit 266. The bicycle electric shifting device 218 further includes a rear internally geared hub 280 that is directly connected by at least one wire (diagrammatically represented by an arrow) to the second control unit 266. Thus, second control unit 266 is used to control both the front derailleur 270 and the rear internally geared hub 280. In this way, the second control unit 266, the front derailleur 270 and the rear internally geared hub 280 are integrated to form the first bicycle electric component. The internally geared hub 280 is a conventional bicycle electric shifting device, and thus will only be brief discussed. The internally geared hub 280 includes the actuator 283 that is controlled by the second control unit 266 via an actuator driver 288. The internally geared hub 280 further includes a position sensor 289 that sends signals to the second control unit 266 to aids in the second control unit 266 controlling the actuator 283, which is in the form of a reversible electric motor.

Figure 15:
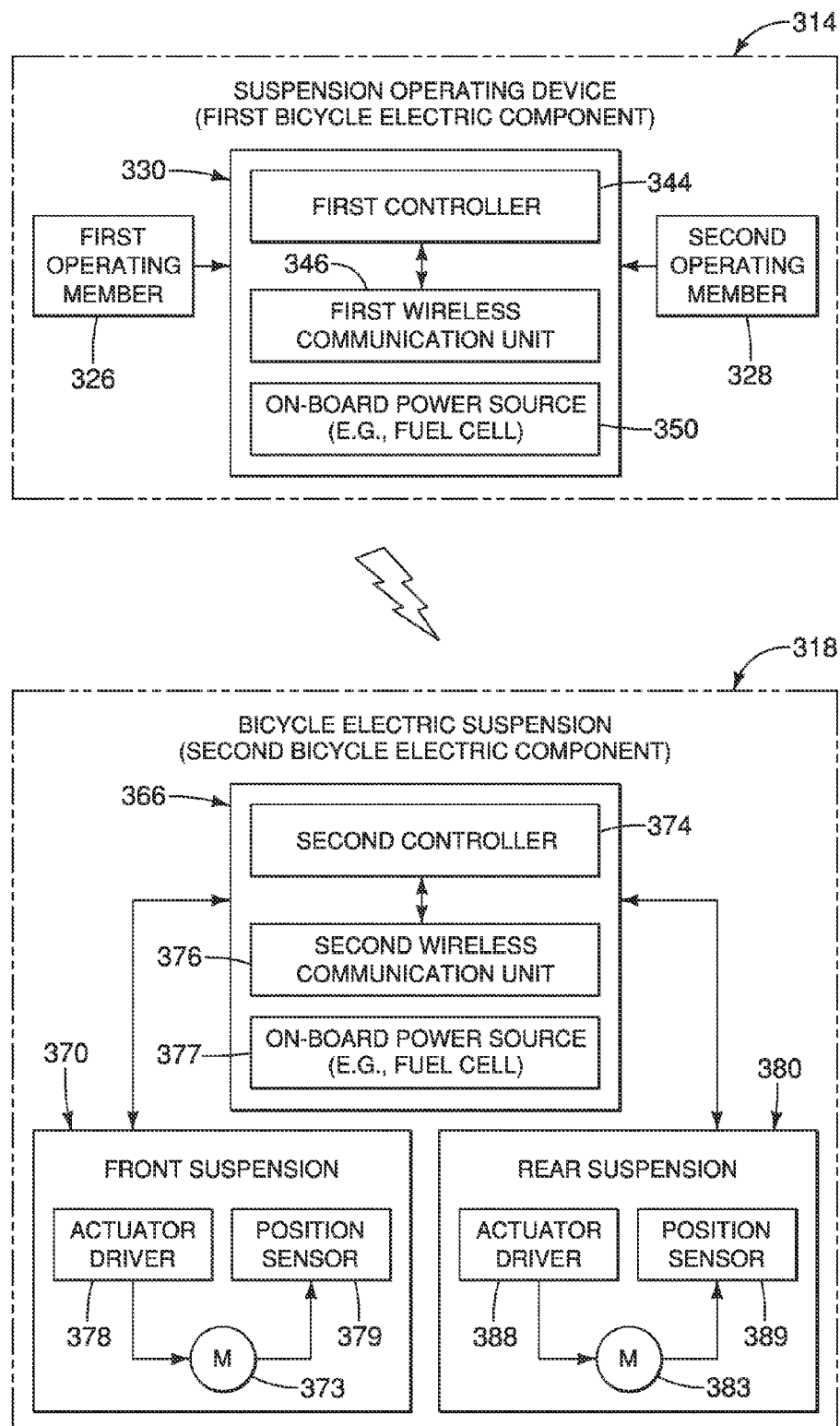
FIG. 15 is a simplified schematic block diagram of an example of a bicycle wireless control system having a suspension control device and an electric suspension.

Referring now to FIG. 15, a simplified schematic block diagram of a bicycle wireless control system is illustrated. Here, the bicycle wireless control system is a bicycle electric suspension adjustment apparatus that includes a suspension control device 314 as a first bicycle electric component and a bicycle electric suspension 318 as a second bicycle electric component. Thus, as explained below, the first bicycle electric component include at least one suspension operating device and the second bicycle electric component include at least one bicycle electric suspension. Here, the suspension operating device 314 includes a first suspension operating member 326, a second suspension operating member 328 and a first control unit 330. The first and second suspension operating members 326 and 328 are directly connected by wires (diagrammatically represented by arrows) to the first control unit 330 to form the first bicycle electric component. The first control unit 330 includes a first controller 344 and a first wireless communication unit 346. Here, the control unit 330 further includes a first on-board power source 350 having a hydrogen powered fuel cell or a secondary battery. The first controller 344 is programmed in the same way as the first controller 44, discussed above to carry out the communication illustrated in FIGS. 8 to 13.

The bicycle electric suspension 318 includes a second control unit 366 and at least one actuating unit such as an electric actuator 373 as explained below. The second control unit 366 includes a second controller 374 and a first wireless communication unit 376. Here, the second control unit 366 further includes a second on-board power source 377 having a hydrogen powered fuel cell or a secondary battery. The second controller 374 is programmed in the same way as the second controller 74, discussed above to carry out the communication illustrated in FIGS. 8 to 13.

The bicycle electric suspension 318 (i.e., the second bicycle electric component) further includes a front suspension 370 that is directly connected by at least one wire (diagrammatically represented by an arrow) to the second control unit 366. In this way, the second control unit 366 and the front suspension 370 are integrated to form the first bicycle electric component. The front suspension 370 is a conventional front suspension, and thus will only be brief discussed. The front suspension 370 includes the actuator 373 that is controlled by the second control unit 366 via an actuator driver 378. The front suspension 370 further includes a position sensor 379 that sends signals to the second control unit 366 to aids in the second control unit 366 controlling the actuator 373, which is in the form of a reversible electric motor.

In the embodiment of FIG. 15, the bicycle electric suspension 318 includes two actuator units, i.e., the actuator 373 and an electric actuator 383, that are controlled by the second control unit 366. The bicycle electric suspension 318 (i.e., the second bicycle electric component) further includes a rear suspension 380 that is directly connected by at least one wire (diagrammatically represented by an arrow) to the second control unit 366. Thus, second control unit 366 is used to control both the front suspension 370 and the rear suspension 380. In this way, the second control unit 366, the front suspension 370 and the rear suspension 380 are integrated to form the first bicycle electric component. The rear suspension 380 is a conventional rear suspension, and thus will only be brief discussed. The suspension 380 includes the actuator 383 that is controlled by the second control unit 366 via an actuator driver 388. The rear suspension 380 further includes a position sensor 389 that sends signals to the second control unit 366 to aids in the second control unit 366 controlling the actuator 383, which is in the form of a reversible electric motor.

Figure 16:
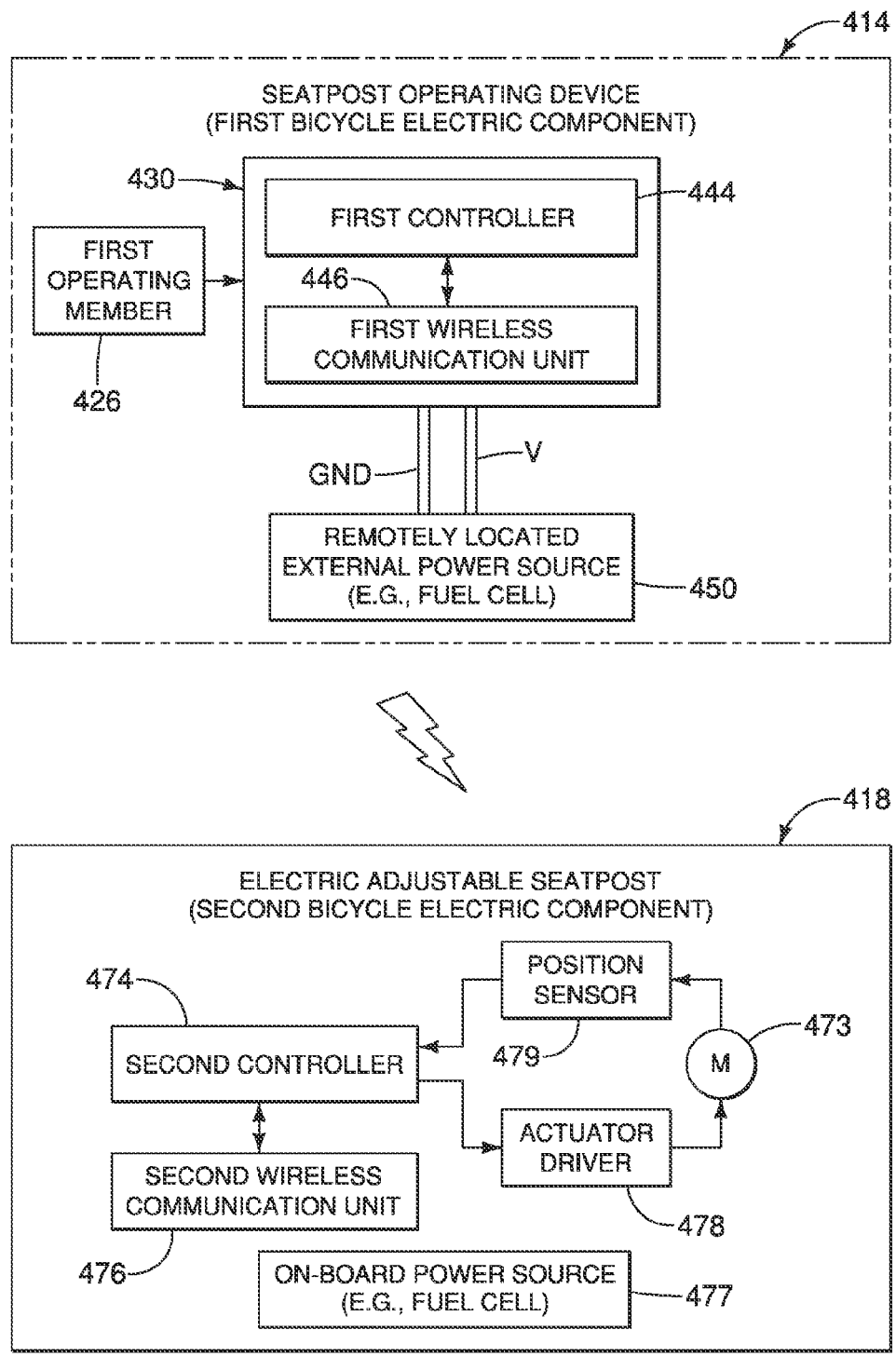
FIG. 16 is a simplified schematic block diagram of an example of a bicycle wireless control system having a seatpost control device and an electric adjustable seatpost.

Referring now to FIG. 16, a simplified schematic block diagram of a bicycle wireless control system is illustrated. Here, the bicycle wireless control system is a bicycle electric seatpost adjustment apparatus that includes a seatpost operating device 414 as a first bicycle electric component and a bicycle electric adjustable seatpost 418 as a second bicycle electric component. Thus, as explained below, the first bicycle electric component include a seatpost operating device and the second bicycle electric component include a bicycle electric adjustable seatpost. Here, the seatpost operating device 414 includes a seatpost operating member 426 and a control unit 430. The seatpost operating member 426 is directly connected by at least one wire (diagrammatically represented by arrows) to the control unit 430 to form the first bicycle electric component. The control unit 430 includes a first controller 444 and a first wireless communication unit 446. Here, the control unit 430 further includes a first on-board power source 450 having a hydrogen powered fuel cell or a secondary battery. The first controller 444 is programmed in the same way as the first controller 44, discussed above to carry out the communication illustrated in FIGS. 8 to 13.

The bicycle electric adjustable seatpost 418 includes an actuating unit such as an electric actuator 473, a second controller 474 and a second wireless communication unit 476. Here, the bicycle electric adjustable seatpost 418 further includes a second on-board power source 477 having a hydrogen powered fuel cell or a secondary battery. The second controller 474 is programmed in the same way as the second controller 74, discussed above to carry out the communication illustrated in FIGS. 8 to 13.

The bicycle electric adjustable seatpost 418 includes the actuator 473 that is controlled by the second controller 474 via an actuator driver 478. The bicycle electric adjustable seatpost 418 further includes a position sensor 479 that sends signals to the second controller 474 to aids in the second controller 474 controlling the actuator 473, which is in the form of a reversible electric motor.

Figure 17:
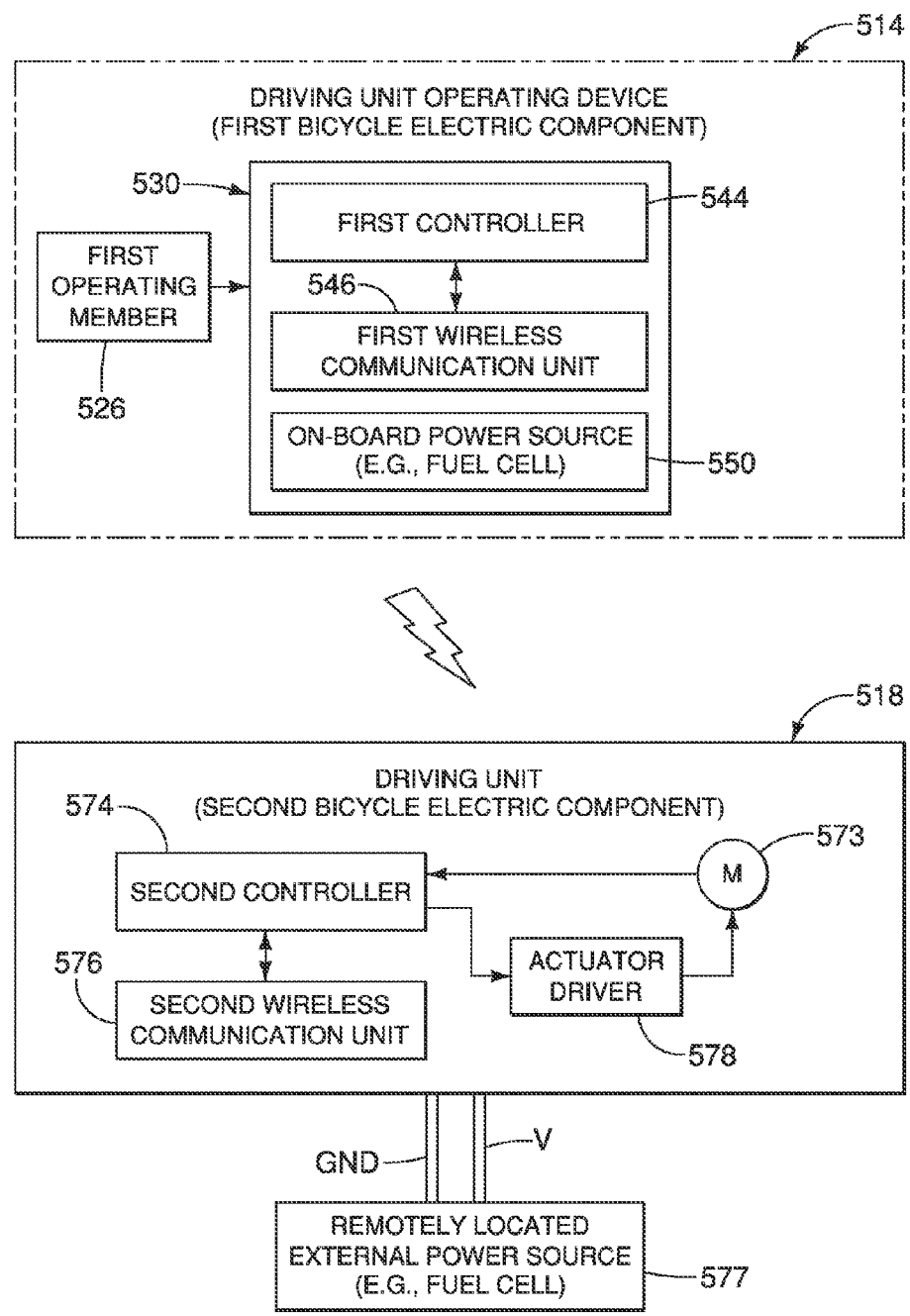
FIG. 17 is a simplified schematic block diagram of an example of a bicycle wireless control system having a power-assist control device and an electric power-assist motor.

Referring now to FIG. 17, a simplified schematic block diagram of a bicycle wireless control system is illustrated. Here, the bicycle wireless control system includes a driving unit operating device 514 as a first bicycle electric component and a driving unit 518 having an electric acturetor 573 to assist pedaling of a rider or the bicycle as a second bicycle electric component. Thus, as explained below, the first bicycle electric component include a driving unit operating device and the second bicycle electric component include a driving unit having an electric acturetor to assist peddling of a rider of the bicycle. Here, the driving unit operating device 514 includes a driving unit operating member 526 and a control unit 530. The driving unit operating member 526 is directly connected by at least one wire (diagrammatically represented by arrows) to the control unit 530 to form the first bicycle electric component. The control unit 530 includes a first controller 544 and a first wireless communication unit 546. Here, the control unit 530 further includes a first on-board power source 550 having a hydrogen powered fuel cell or a secondary battery. The first controller 544 is programmed in the same way as the first controller 44, discussed above to carry out the communication illustrated in FIGS. 8 to 13.

The driving unit 518 includes an actuating unit such as an electric actuator 573, a second controller 574 and a first wireless communication unit 576. Here, the driving unit 518 further includes a remotely located power source 577 having a hydrogen powered fuel cell or a secondary battery. Thus, the second bicycle electric component includes the second power source 577 that is electrically connected to the electric actuator 573 by an electrical wire. The second controller 574 is programmed in the same way as the second controller 74, discussed above to carry out the communication illustrated in FIGS. 8 to 13.

The driving unit 518 includes the actuator 573 that is controlled by the second controller 574 via an actuator driver 578.

While only selected embodiments have been chosen to illustrate the present invention, it will be apparent to those skilled in the art from this disclosure that various changes and modifications can be made herein without departing from the scope of the invention as defined in the appended claims.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle wireless control system. Accordingly, these directional terms, as utilized to describe the bicycle wireless control system should be interpreted relative to a bicycle in an upright riding position on a horizontal surface and that is equipped with the bicycle wireless control system. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

The foregoing descriptions of the embodiments according to the present invention are provided for illustration only, and not for the purpose of limiting the invention as defined by the appended claims and their equivalents.

What is claimed is:

1. A bicycle wireless control system comprising:
a first bicycle electric component including at least one operating member, a first controller, and a first wireless communication unit that wirelessly transmits a control signal in response to an operation of the at least one operating member; and
a second bicycle electric component including a second wireless communication unit and a second controller,
the second wireless communication unit being configured to wirelessly receive the control signal from the first wireless communication unit and to wirelessly transmit an acknowledgement signal to the first wireless communication unit upon receiving the control signal from the first wireless communication unit, and the second wireless communication unit being configured to wirelessly transmit an additional acknowledgement signal upon a determination that the first wireless communication unit continues to wirelessly transmit the control signal after the second wireless communication unit transmits the acknowledgement signal, and
the second controller being programmed to periodically operate the second wireless communication unit for a predetermined listening period, to control the second wireless communication unit to transmit the additional acknowledgement signal during the predetermined listening period in which the first wireless communication unit continues to wirelessly transmit the control signal, and to periodically suspend the second wireless communication unit for a predetermined non-listening period after the predetermined listening period passes.

2. The bicycle wireless control system according to claim 1, wherein
the first controller is programed to stop transmitting the control signal from the first wireless communication unit upon receiving the acknowledgement signal from the second wireless communication unit.

3. The bicycle wireless control system according to claim 2, wherein
the first bicycle electric component includes a first power source electrically connected to the first controller by an electrical wire.

4. The bicycle wireless control system according to claim 1, wherein
the first wireless communication unit is configured to stop wirelessly transmitting the control signal after a predetermined stop period passes.

5. The bicycle wireless control system according to claim 4, wherein
the predetermined stop period is equal to or longer than the predetermined non-listening period.

6. The bicycle wireless control system according to claim 1, wherein
the first bicycle electric component includes a first on-board power source.

7. The bicycle wireless control system according to claim 6, wherein
the first on-hoard power source includes a fuel cell.

8. The bicycle wireless control system according to claim 1, wherein
the second bicycle electric component includes a second on-board power source.

9. The bicycle wireless control system according to claim 8, wherein
the second on-board power source includes a fuel cell.

10. The bicycle wireless control system according to claim 1, wherein
the second bicycle electric component includes a second power source electrically connected to an electrical actuator b an electrical wire.

11. The bicycle wireless control system according to claim 1, wherein
the first bicycle electric component includes an operating device; and
the second bicycle electric component includes a bicycle electric shifting device.

12. The bicycle wireless control system according to claim 11, wherein
the bicycle electric shifting device is a bicycle derailleur.

13. The bicycle wireless control system according to claim 11, wherein
the bicycle electric shifting device includes an internally geared hub.

14. The bicycle wireless control system according to claim 1, wherein
the first bicycle electric component includes a suspension operating device; and
the second bicycle electric component includes a bicycle electric suspension.

15. The bicycle wireless control system according to claim 1, wherein
the first bicycle electric component includes a seatpost operating device; and
the second bicycle electric component includes an electric adjustable seatpost.

16. The bicycle wireless control system according to claim 1, wherein
the first bicycle electric component includes a driving unit operating device; and
the second bicycle electric component includes a. driving unit having an electric actuator to assist pedaling of a rider of the bicycle.

* * * * *